United States Patent
Perez Acosta et al.

(10) Patent No.: US 9,928,156 B2
(45) Date of Patent: Mar. 27, 2018

(54) MISSING INCLUDE SUGGESTIONS FOR EXTERNAL FILES

(71) Applicant: Microsoft Technology Licensing, LLC, Redmond, WA (US)

(72) Inventors: Raul Fernando Perez Acosta, Redmond, WA (US); Marian Luparu, Kenmore, WA (US)

(73) Assignee: MICROSOFT TECHNOLOGY LICENSING, LLC., Redmond, WA (US)

(*) Notice: Subject to any disclaimer, the term of this patent is extended or adjusted under 35 U.S.C. 154(b) by 53 days.

(21) Appl. No.: 15/014,055

(22) Filed: Feb. 3, 2016

(65) Prior Publication Data

US 2017/0116109 A1   Apr. 27, 2017

Related U.S. Application Data

(60) Provisional application No. 62/245,717, filed on Oct. 23, 2015.

(51) Int. Cl.
  *G06F 9/44* (2006.01)
  *G06F 11/36* (2006.01)
  *G06F 9/45* (2006.01)

(52) U.S. Cl.
  CPC .......... *G06F 11/3624* (2013.01); *G06F 8/33* (2013.01); *G06F 8/42* (2013.01); *G06F 11/3664* (2013.01); *G06F 11/3688* (2013.01)

(58) Field of Classification Search
  CPC ........ G06F 8/41; G06F 8/427; G06F 11/3664; G06F 11/3688

USPC ................................ 717/125, 140, 143, 124
See application file for complete search history.

(56) References Cited

U.S. PATENT DOCUMENTS

| | | |
|---|---|---|
| 5,956,513 A | 9/1999 | McLain |
| 6,305,008 B1 | 10/2001 | Vaidyanathan et al. |
| 6,493,868 B1 * | 12/2002 | DaSilva ............... G06F 8/20 345/1.3 |
| 8,196,112 B1 * | 6/2012 | Cansizlar .......... G06F 17/30905 717/116 |
| 8,423,982 B2 | 4/2013 | Goldstein et al. |
| 8,544,016 B2 * | 9/2013 | Friedman ............ G06F 11/3664 717/107 |
| 8,954,940 B2 | 2/2015 | Flicker et al. |

(Continued)

OTHER PUBLICATIONS

Vo et al., "Incl: A Tool to Analyze Include Files", 2006.*

(Continued)

*Primary Examiner* — Phillip H Nguyen

(57) ABSTRACT

When writing program code, syntax errors can be detected and a diagnostic error message can be provided. One of the causes of errors in a C-based programming language such as but not limited to C++ is a missing definition. The definition can exist in a file that is separate from the source program file. The file may be designated by a particular statement such as a "#include" statement which points to the file in which the token used in the code is defined. The list of files and their relationships form an include graph. A feature inside an IDE can suggest potential "#include" statements to correct a missing "#include" statement error. By using the include graph a more accurate list of potential corrections can be suggested so that standard and platform independent code can be written.

19 Claims, 10 Drawing Sheets

(56) References Cited

U.S. PATENT DOCUMENTS

| | | | |
|---|---|---|---|
| 8,997,067 | B2 | 3/2015 | Igelka |
| 2003/0028864 | A1 | 2/2003 | Bowen |
| 2004/0015502 | A1 | 1/2004 | Alexander et al. |
| 2005/0039162 | A1* | 2/2005 | Cifra .................... G06F 3/0486 717/105 |
| 2006/0277525 | A1* | 12/2006 | Najmabadi ............. G06N 5/04 717/106 |
| 2009/0089770 | A1 | 4/2009 | Shamilian et al. |
| 2009/0300641 | A1* | 12/2009 | Friedman ........... G06F 11/3664 718/104 |
| 2010/0064284 | A1 | 3/2010 | Winter |
| 2014/0109042 | A1 | 4/2014 | Christensen |
| 2016/0117154 | A1* | 4/2016 | Przygienda ............ G06F 8/433 717/152 |

OTHER PUBLICATIONS

Eshkevari et al., Identifying and locating interference issues in Content Management Systems, Mar. 10, 2014.*
Hu et al., C/C++ Conditional Compilation Analysis Using Symbolic Execution, 2000.*
Knapen et al., "Parsing C++ despite missing declarations", 1999.*
Ernst et al., "An Empirical Analysis of C Preprocessor Use", 2000.*
Vidács, "Software Maintenance Methods for Preprocessed Languages", 2009.*
Sutton et al., "How We Manage Portability and Configuration with the C Preprocessor", 2007.*
Byron, "Essential Tools to Manage Import Statements in Eclipse", Published on: Jan. 14, 2014 Available at: http://www.eclipseonetips.com/2014/01/14/essential-tools-to-manage-import-statements-in-eclipse/.
"Code Assistance in the NetBeans IDE Java Editor: A Reference Guide", Published on: Mar. 18, 2015 Available at: https://netbeans.org/kb/docs/java/editor-codereference.html#imports.
Gannod, et al., "An Investigation into the Connectivity Properties of Source-Header Dependency", In Proceedings of the Eighth Working Conference on Reverse Engineering, Oct. 2001, pp. 115-124.
Ravi, Master, "How to create Dependency Graphs for Header Files", Published on: Dec. 8, 2011 Available at: https://masterravi.wordpress.com/2011/12/08/dependency-graph/.
Nanjappa, Ashwin, "How to Create Header Include Graph Using Doxygen", Published on: Dec. 24, 2013 Available at: http://codeyarns.com/2013/12/24/how-to-create-header-include-graph-using-doxygen/.
Knapen, et al., "Parsing C++ Despite Missing Declarations", In Proceedings of Seventh International Workshop on Program Comprehension, May 5, 1999, 12 pages.
"IncludeManager Tutorial", Published on: Sep. 24, 2006 Available at: http://www.profactor.co.uk/prod_docs/IncludeManager/Tutorial.html.
Davies, Joshua, "Where Does GCC Look to Find its Header Files?", Published on: Dec. 21, 2013 Available at: http://commandlinefanatic.com/cgi-bin/showarticle.cgi?article=art026.
Medeiros, et al., "Investigating Preprocessor-Based Syntax Errors", In Proceedings of 12th International Conference on Generative Programming: Concepts & Experiences, Oct. 27, 2013, 10 pages.
"Header files and the preprocessor", Published on: Apr. 19, 2007 Available at: http://blogs.msdn.com/b/vcblog/archive/2007/04/19/header-files-and-the-preprocessor-can-t-live-with-em-can-t-live-without-em.aspx.
Teune, Ian, "IDE doesn't Honor Preprocessor Conditionals When Including Libraries", Published on: Feb. 2, 2014 Available at: https://github.com/arduino/Arduino/issues/1841.
"International Search Report and Written Opinion Issued in PCT Application No. PCT/US2016/057303", dated Dec. 19. 2016, 12 Pages.
"Second Written Opinion Issued in PCT Application No. PCT/US2016/057303", dated Nov. 27, 2017, 7 Pages.

* cited by examiner

MISSING INCLUDE SUGGESTIONS FOR EXTERNAL FILES

BACKGROUND

The C programming language is a widely-used, general-purpose, imperative computer programming language. C supports structured programming, lexical variable scope and recursion. C implements a static type system. C has built-in features that enable efficient mapping to typical machine instructions, and because of this, is frequently used instead of assembly language and for operating systems, in addition to its use in application software. In C, executable code is packaged into subroutines, called "functions". C program source text is free-format. The semicolon is used as a statement terminator. Curly braces are used to group blocks of statements.

A common example of a C program is the "hello, world" program:

```
#include <stdio.h>
int main(void)
{
    printf("hello, world\n");
}
```

The first line of the program includes the preprocessing directive, "#include". The preprocessor of the compiler will replace the "#include <stdio.h>" line with the contents of the stdio.h file. The stdio.h file is a standard header. A header includes declarations for functions (e.g., stdio.h includes the declaration for the function "printf").

The C programming language can be extended using libraries. A C library is a collection of functions in a file. Each library typically includes a header file. The header file includes the prototypes of the functions included in the library that can be used by a program. The header file can also include declarations of special data types and macro symbols used with these functions. To use a library, a program includes the name of the library's header file. During compilation, the library is linked with the program.

A number of programming languages have been based on C, including but not limited to C++, and MIDL (Microsoft Interface Definition Language). C++ is a Turing-complete general purpose programming language that supports object-oriented programming MIDL is a programming language that can be used to define interfaces between client and server programs. MIDL enables developers to create the interface definition language (IDL) files and application configuration files (ACF) required for remote procedure call (RPC) interfaces and COM/DCOM (Component Object Model/Distributed Component Object Model) interfaces. MIDL also supports the generation of type libraries for OLE (Object Linking and Embedding) Automation.

SUMMARY

When writing program code, many types of errors can be detected and a diagnostic error message can be provided. For example, in an integrated development environment (IDE), syntax errors can be indicated in various ways as the developer enters the programming source code in a source code editor. For example, a syntax error can be indicated by the presence of a red squiggly line under a token in the source program editor. One type of error that can be detected is an undefined token error. The token may be defined in a file external to the source code and the source code may specify in some way the file in which the token is defined. A graph can be created in which the source code and all the other files needed for the application or applications are represented. A tool can use this graph to suggest potential suggestions to correct the undefined token error. For example, in some programming languages such as but not limited to C++ and other C-based languages, an undefined token error can be caused by a missing definition. In C-based languages, a token definition can exist in a file that is separate from the source program file. The file in which the token is defined may be designated in the source code by a particular statement such as a "#include" statement. A "#include" statement in some C-based languages points to the file in which the token used in the code is defined. These files in turn can include other files. The list of files and their relationships form what is known as an include graph, where a node in the graph represents a file and relationships are represented by the way the nodes of the include graph are arranged. A feature inside an IDE can suggest potential "#include" statements to correct a missing "#include" statement error. By using the include graph a more accurate list of potential corrections can be suggested so that standard and platform independent code can be written.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Known implementations of programming tools that provide suggestions for missing "#include" statements only show the "#include" statement file options in which the token is defined. The main problem with this approach is that in some C-based programming languages that use headers, such as but not limited to C++, it is common for libraries to have an abstraction layer for headers. This is typically done so that there can be platform specific implementations at the low level while keeping the user code platform independent. For example, suppose that when using the string type defined in the C++ standard, the header that is supposed to be included is "string" (the abstraction) but the type is actually defined in the platform specific header file "xstring" (actual). Thus, while suggesting the "xstring" file may be technically correct, it can result in code that is platform dependent and non-standard. Using the "string" header file enables abstraction of the code so that the code is platform independent. To produce platform independent code the top level "#include" statement is the one that should be added to the program source code and not the low level one.

In accordance with aspects of the subject matter described herein, a programming tool can suggest potential "#include" statements to correct a syntax error comprising a missing "#include" statement (missing definition file), enabling standard and platform independent code to be written more easily. As used herein, standard code is code that complies with guidelines for writing program source code. The include graph for the project can be used to find all paths originating from the file including the token. Each path can be traversed. The path being traversed can be segmented based on the folder (directory) in which the node resides. When a node in the path belongs to the project the traversal of the path can stop. For each segment identified, the file at the top can be offered as a suggestion for auto-completion or correction. A segment closer to the top of the include graph can be suggested before a segment that is farther away. The file where the token is defined can be offered as the last suggestion in the list of suggestions. While the subject matter is described in the context of an IDE, it will be appreciated that the subject matter applies equally to programming tools that execute in a stand-alone fashion, outside of an IDE. In this scenario, suggestions may be provided in a printable report or in other suitable ways. It will be appreciated that although described in the context of missing definitions in a C-based programming language the subject matter described herein is applicable to many programming environments in which an undefined token is detected.

Missing Include Suggestions for External Files

Figure 1A:
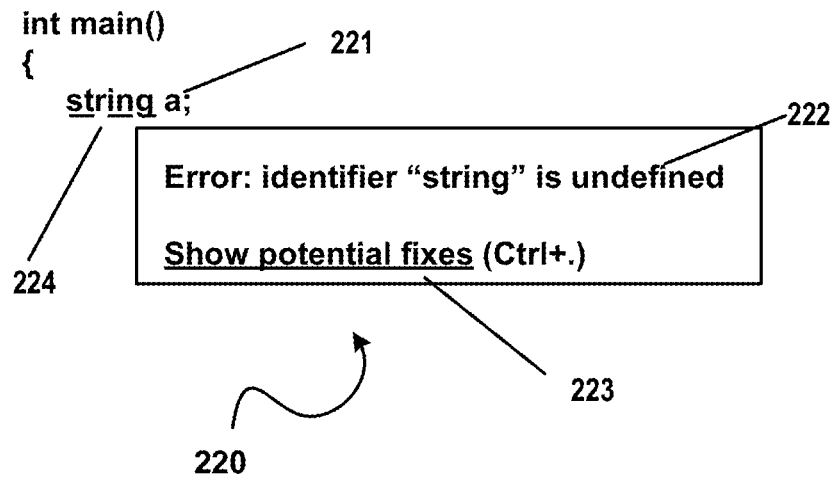
FIG. 1a illustrates an example 220 of a display of a diagnostic error triggered because of an undefined token (e.g., type or function), where the token is undefined because of a missing token definition file in accordance with aspects of the subject matter described herein.
Figure 1B:
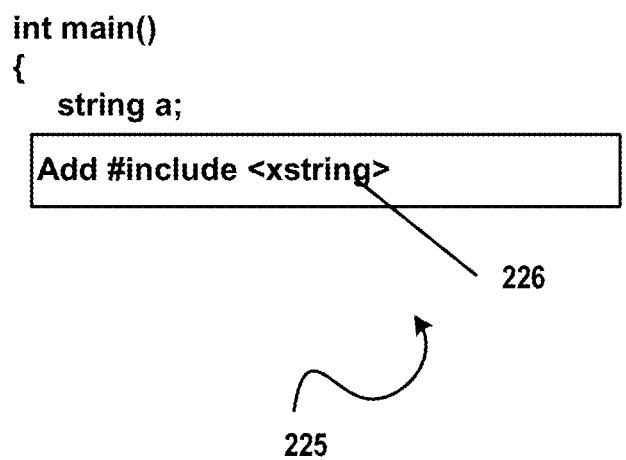
FIG. 1b illustrates an example 225 of a simple implementation of suggested "#include" statements in accordance with aspects of the subject matter described herein.

FIG. 1a illustrates an example 220 of a diagnostic error that may be displayed for an undefined token such as a data type or function. In FIG. 1a, the error is indicated by a hatched line 224 but it will be understood by those of skill in the art that the error can be indicated in any suitable way such as but not limited to a squiggly line, highlighting, underlining or by otherwise identifying the undefined identifier (token). In FIG. 1a the error indicates that the data type "string" 221 is undefined. An error message 222 "Error: identifier "string" is undefined" is displayed. Selecting the "Show potential fixes" feature 223 may result in the display of "Add #include <xstring>" 226, as illustrated in example 225 of FIG. 1b. However, as described above, while the include statement "#include <xstring>" is technically correct because string type is defined in the file xstring, use of that include statement would create non-standard, platform dependent program code.

Figures 1C, 1I:
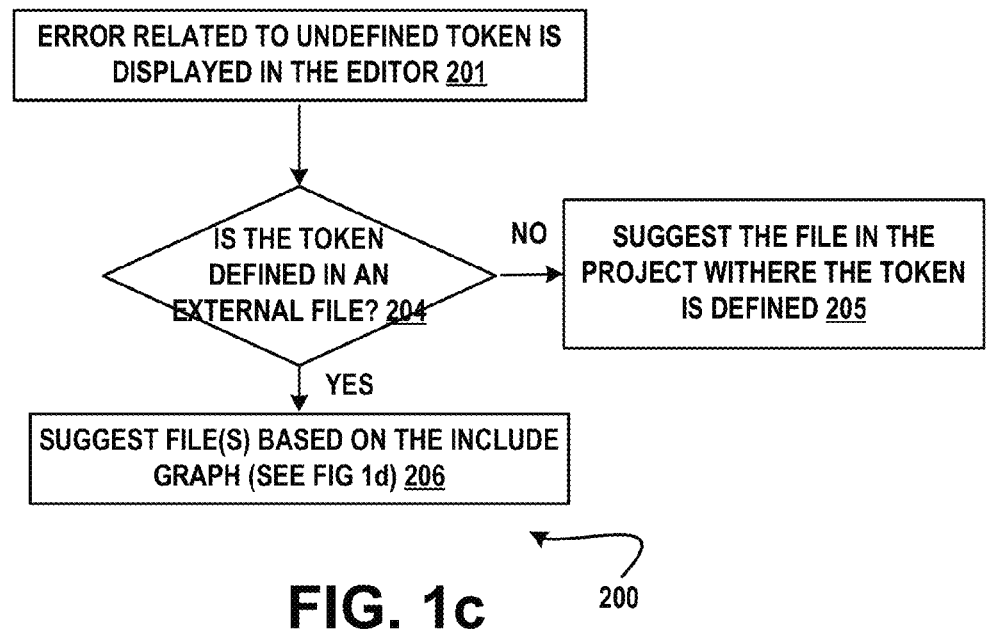
FIG. 1c illustrates a method 200 describing how a list of missing "#include" statements are generated and/or suggested for undefined tokens in accordance with aspects of the subject matter described herein.
FIG. 1i illustrates a display 250 that displays suggested "#include" statements as may be displayed in accordance with aspects of the subject matter described herein.

FIG. 1c illustrates an example of a method 200 that can be used for providing suggestions for missing "#include" statements in accordance with aspects of the subject matter disclosed herein. The method described in FIG. 1c can be practiced by a system such as but not limited to the one described with respect to FIG. 2. While method 200 describes a series of operations that are performed in a sequence, it is to be understood that method 200 is not limited by the order of the sequence depicted. For instance, some operations may occur in a different order than that described. In addition, one operation may occur concurrently with another operation. In some instances, not all operations described are performed. In some instances, not all operations performed are illustrated.

At operation 201 an error relating to an undefined token (e.g., type or function) can be detected. The token may be undefined because, for example, the file (e.g., a header file) that includes the definition of the token is missing from the program source code. At operation 204 it can be determined if the token is defined in an external file. In response to determining that the token is not defined in an external file (a file that is external to a project, where the term "project" refers to a logical unit including properties and files used to build a binary), at operation 205 the file in the project where the token is defined can be suggested at operation 205. In response to determining that the token is defined in an external file the external file can be suggested based on the include graph at operation 206, as described more fully below.

Figure 1D:
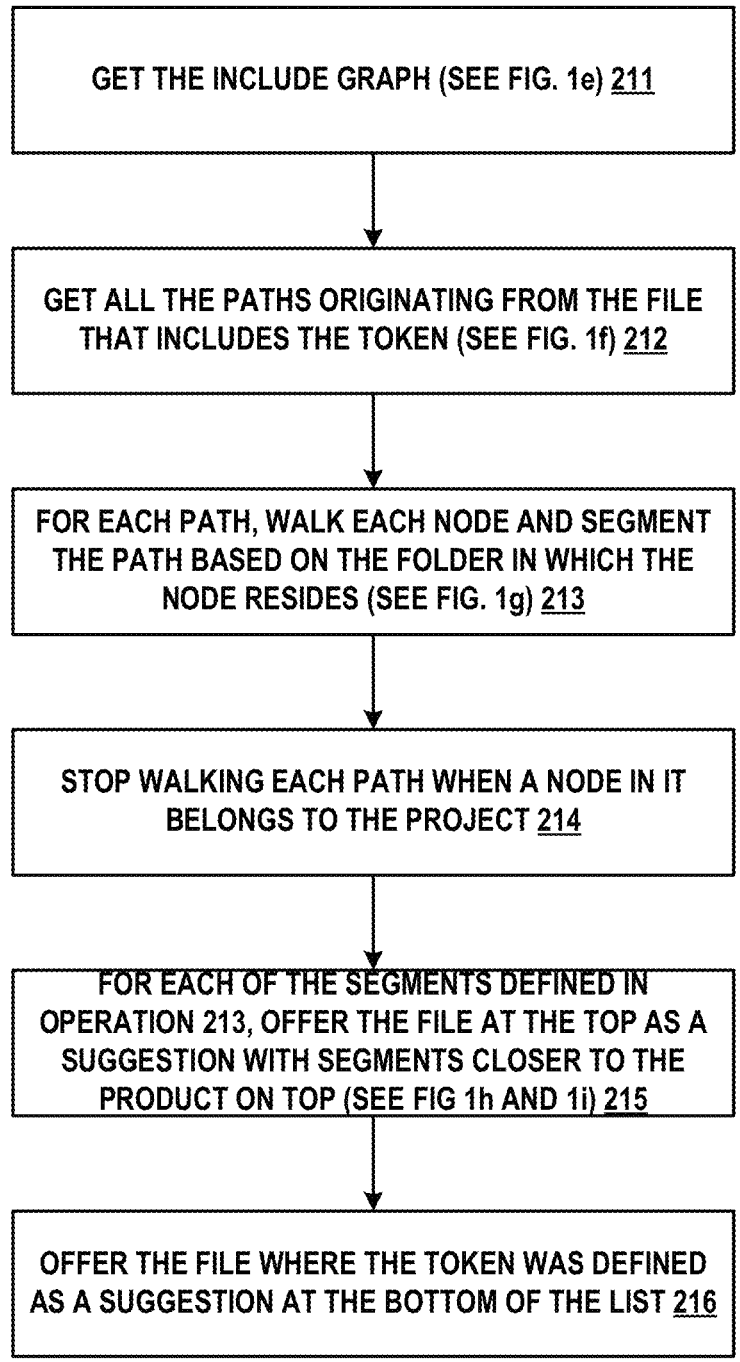
FIG. 1d illustrates a method 210 describing how missing "#include" statements are suggested for tokens that are defined in a file that is part of the include graph for a file that is not part of the project (external to the project) in accordance with aspects of the subject matter described herein.

FIG. 1d illustrates an example of a method 210 that can be used to determine suggestions for correcting undefined token errors in accordance with aspects of the subject matter disclosed herein. The method described in FIG. 1d can be practiced by a system such as but not limited to the one described with respect to FIG. 2. While method 210 describes a series of operations that are performed in a sequence, it is to be understood that method 210 is not limited by the order of the sequence depicted. For instance, some operations may occur in a different order than that described. In addition, one operation may occur concurrently with another operation. In some instances, not all operations described are performed. In some instances, not all operations performed are illustrated.

Figure 1E:
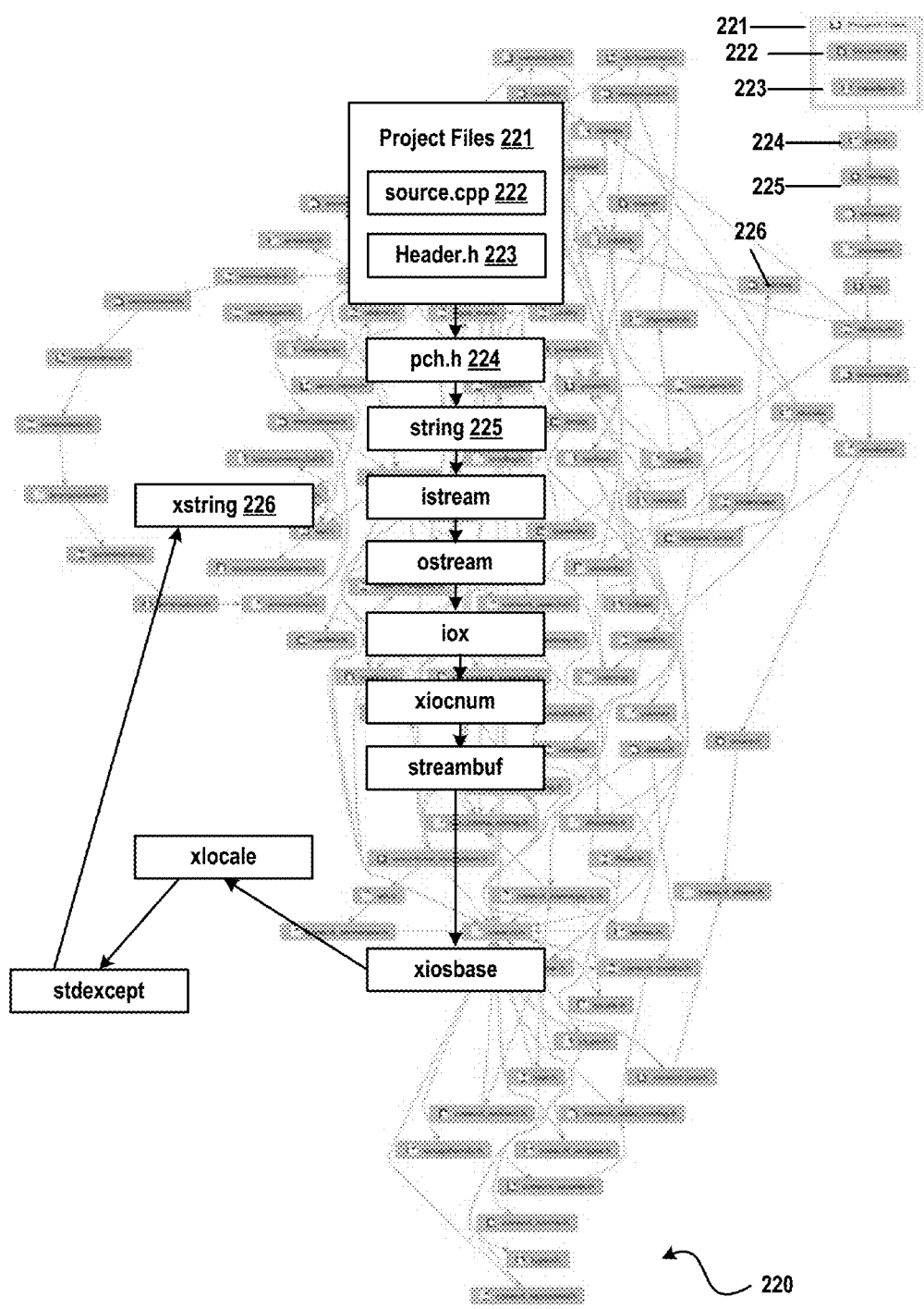
FIG. 1e illustrates an include graph 220 for a project in accordance with aspects of the subject matter described herein.

At operation 211 the include graph can be accessed. An example of an include graph is illustrated in FIG. 1e. At operation 212 all the paths that originate from the file that includes the token can be obtained. Operation 212 is described in more detail with respect to FIG. 1f. At operation 213 each path that originates from the file that includes the token can be traversed, as described more fully with respect to FIG. 1g. Each path traversed can be segmented based on the folder in which the node resides. At operation 214 the traversal of each path can stop when a node in it belongs to the project. That is, for each of the paths walk up the include graph from the initial file (that is, the file that includes the token) and every time the folder containing the file changes, display the last file in that folder as a suggestion. Stop walking up each path when a file in it is part of the current project (and do not offer files in project as a suggestion). That is, at operation 215 for each segment identified at operation 213 the file at the top can be offered as a suggestion with the segment that is closest to the project node in the include graph being offered at the top of the list while those that are farther away from the project can be offered farther from the top of the list. That is, suggestions can be displayed in order of proximity to the project node. This is described more fully with respect to FIGS. 1h and 1i. At operation 216 the file where the token was defined can be offered as a suggestion at the bottom of the list. This method can handle the case of standard libraries where for the "string" example suggested fixes of "string" and "xstring" would be displayed as shown in FIG. 1i. Additionally, in the event there are more than one folder in the path to the file, additional suggestions can be displayed. Thus, for example, if the project uses a precompiled header and string is already included in the header the suggestions can be:

Add #include <pch.h>
Add #include <string>
Add #include <xstring>

Where pch.h is the precompiled header including the definition of string.

Figure 1F:
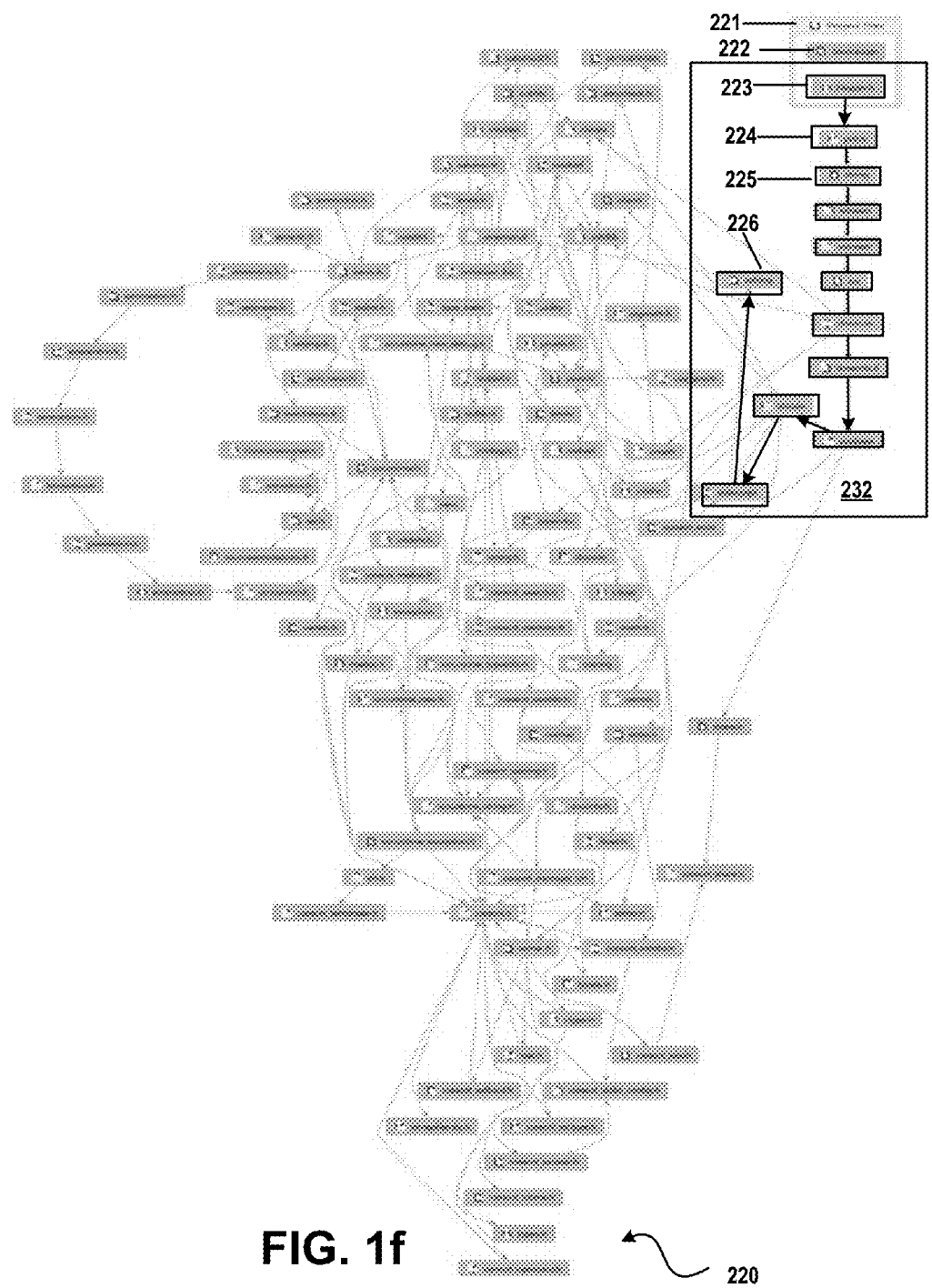
FIG. 1f illustrates a path 232 from a file in which the token is defined to the project in accordance with aspects of the subject matter described herein.
Figure 1G:
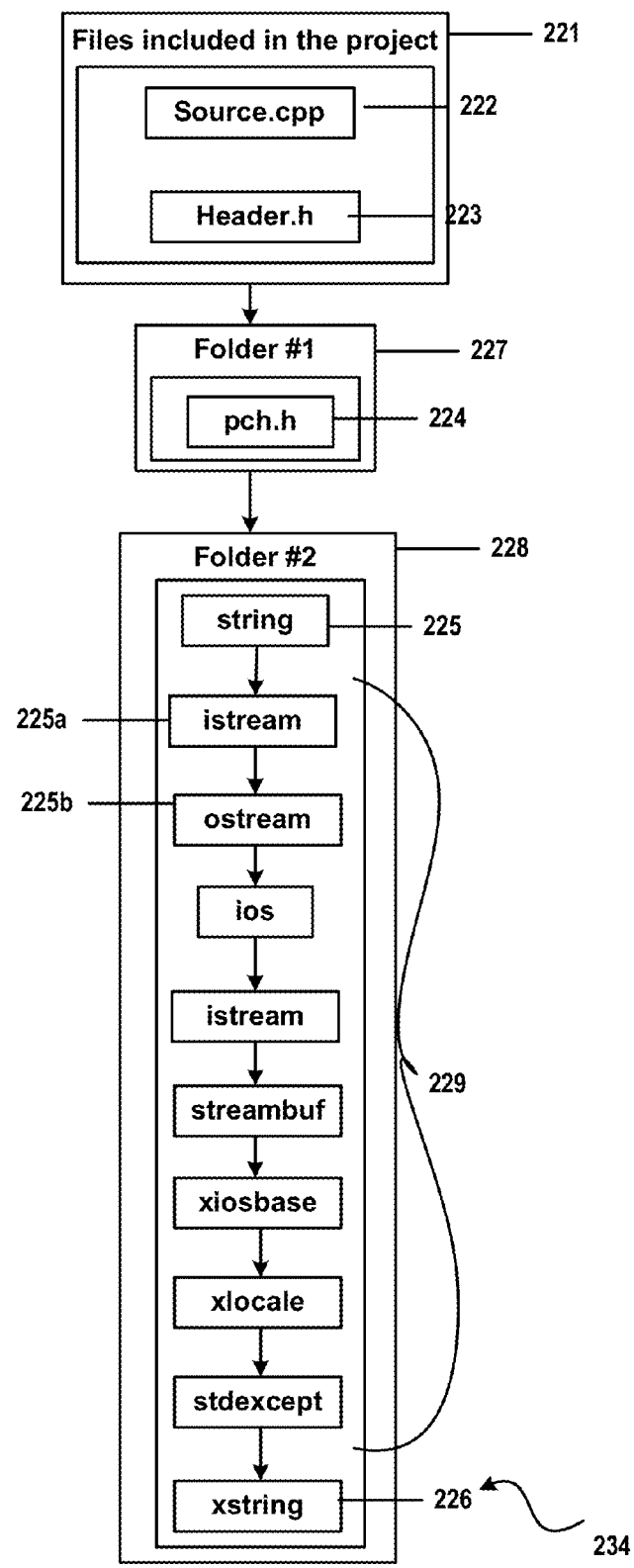
FIG. 1g illustrates a single path 234 segmented based on the folders that include the files in accordance with aspects of the subject matter described herein.
Figure 1H:
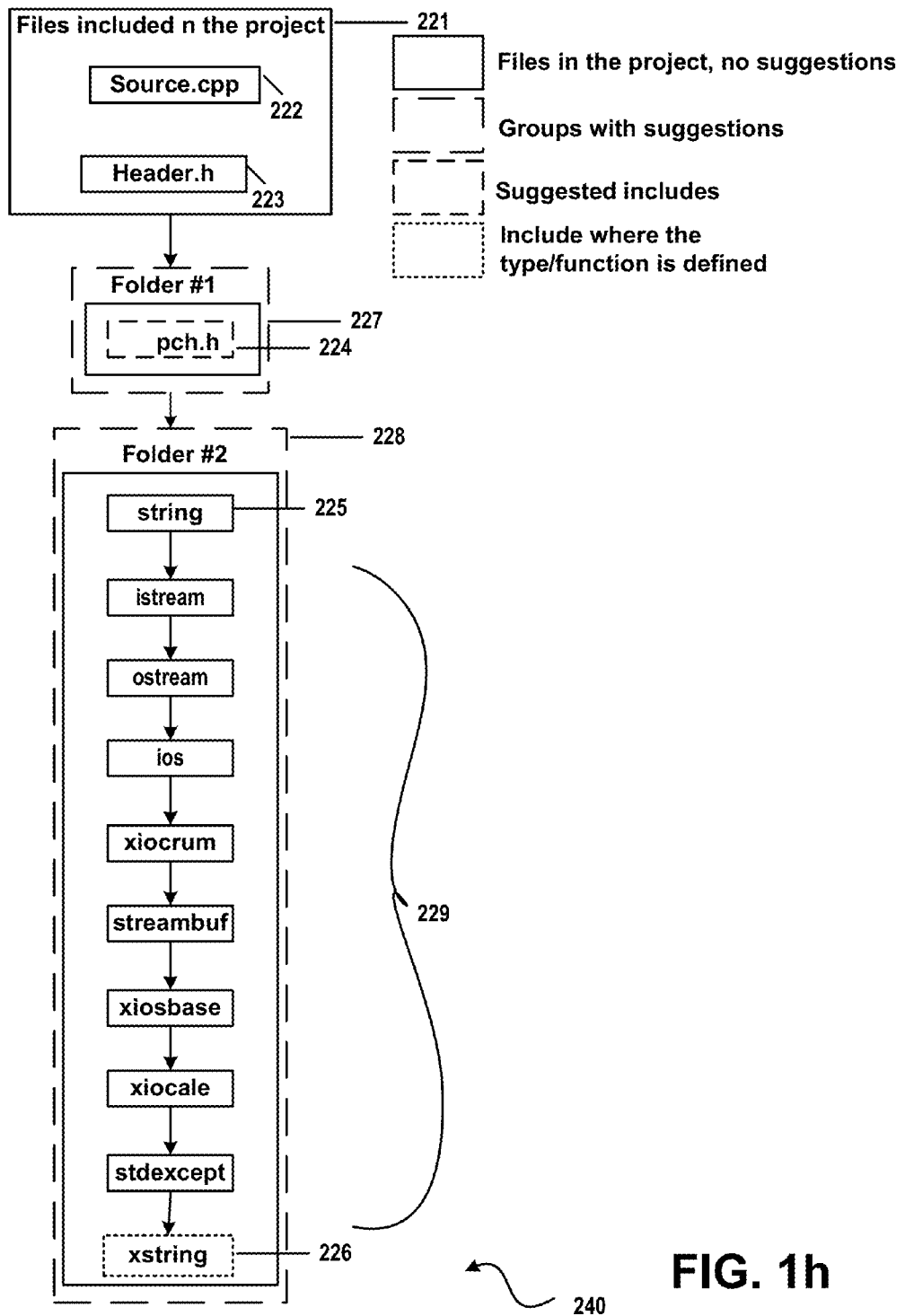
FIG. 1h illustrates selected files from the segmented path in accordance with aspects of the subject matter described herein.

FIG. 1e illustrates an example of an include graph 220 for a project 221. In this project 221 are two files: Source.cpp 222 and Header.h 223. As used herein, the term "project" refers to the collection of files needed to produce an executable for a software product. Node 224 is pch.h, node 225 is string and node 226 is xstring. Intervening nodes are unlabeled as are other nodes in the include graph 220. The overlay is a larger representation of the nodes 221, 222, 223, 224, 225 and 226 and the intervening nodes on the path from xstring to the node representing the project 221. FIG. 1f shows the include graph 220 with the path that goes from the file where the token is defined in the project to the project node 221 where the path is distinguished by placement in the box 232. FIG. 1g illustrates the segmentation of a single path where the segmentation is based on the folders including the files defining the token. That is, FIG. 1g illustrates a segmented path 234 in which the first segment comprises the files included in the project 221: source.cpp 222 and header.h 223. A second segment comprises a first folder, 227 and includes the pch.h file 224. A third segment comprises a second folder 228 which includes a file string 225, a number of intervening files 229 and the lowest level file xstring 226. In the second folder 228, the file string 225 has a dependency on (includes) the file istream 225a. The file istream 225a has a dependency on file ostream 225b and so on. FIG. 1h illustrates selected files 240 from the segmented path. For files that are included in the project 221 (source.cpp 222 and header.h 223) no suggestions are provided in the tool. The folders 227 and 228 are groups that potentially will yield suggestions. The file pch.h 224 and the file string 225 will be suggested as a potential error fix. The file xstring 226 will also appear in the list of suggestions. FIG. 1i illustrates suggestions 251 in a display 250 for correcting the missing #include statement comprising the #include statement that defines string. Although typically the lowest level file would be preferred because fewer dependencies would be required, when selecting the lowest level file would result in non-standard, platform dependent code, the highest level file is preferred because it will make for standard, platform independent code.

Figure 2:
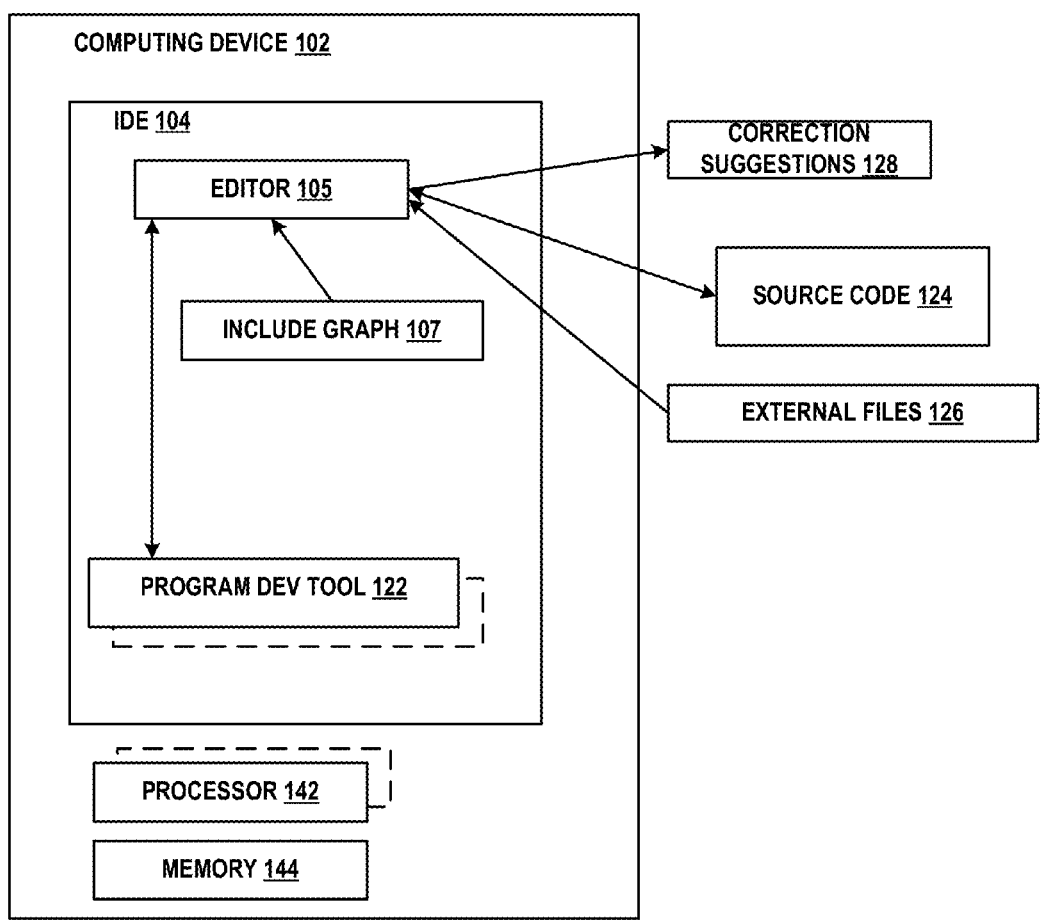
FIG. 2 is a block diagram of a system 100 that can perform one or more of the methods described above in accordance with aspects of the subject matter described herein.

FIG. 2 illustrates a block diagram of a system 100 for generating and displaying missing #include suggestions (displaying files whose inclusion in the project would correct the undefined token error) in program code in accordance with aspects of the subject matter described herein. All or portions of system 100 may reside on one or more computers or computing devices such as the computers described below with respect to FIG. 3. Contemplated computing devices include but are not limited to desktop computers, tablet computers, laptop computers, notebook computers, personal digital assistants, smart phones, cellular telephones, mobile telephones, sensors, and so on. Thus, a computing device (e.g., computing device 102, etc.) can be any type of stationary or mobile computing device, including a desktop computer (e.g., a personal computer, etc.), a mobile computer or computing device (e.g., a Palm® device, a RIM Blackberry® device, a personal digital assistant (PDA), a laptop computer, a notebook computer, a tablet computer (e.g., an Apple iPad™), a netbook, etc.), a mobile phone (e.g., a cell phone, a smart phone such as an Apple iPhone, a Google Android™ phone, a Microsoft Windows® phone, etc.), or other type of mobile device.

System 100 or portions thereof may comprise a portion of an integrated development environment 104 (IDE) such as the ones described and illustrated below with respect to FIG. 4, residing on one or more computers such as the computers described with respect to FIG. 3 also described below. Alternatively, system 100 or portions thereof may be provided as a stand-alone system or as a plug-in.

System 100 can include one or more computing devices such as computing device 102. A computing device can include one or more processors such as processor 142, etc., and a memory such as memory 144 that communicates with the one or more processors. System 100 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud.

System 100 may include any combination of one or more of the following: one or more program modules comprising program development tools. One such program development tool can be program development tool 122, an editor such as editor 105, one or more external files such as external files 126, an include graph such as include graph 107, input program source code such as source code 124 and correction suggestions display 128. System 100 may also include program development elements known in the arts including but not limited to one or more compilers, pre-processors, databases etc., some of which may be generated by a compiler or other program development tool and so on. It will be understood that when loaded into the memory and accessed by the one or more processors, the element may cause the one or more processors to perform the functions and operations attributed to the element. A program development tool such as program development tool 122 may generate and/or display suggestions for missing statements that identify a file in which a token is defined, as described more fully above. All or portions of system 100 may reside on one or more computers such as the computers described below with respect to FIG. 3.

A compiler can be a computer program or set of programs that translates text written in a (typically high-level) programming language (input source code 124) into another (typically lower-level) computer language (the target language). The output of the compiler may be object code (not shown). Typically the output is in a form suitable for processing by other programs (e.g., a linker), but the output may be a human-readable text file. Source code 124 is typically compiled to create an executable program but may be processed by various program development tools which may include tools such as editors, beautifiers, static analysis tools, refactoring tools and others that operate in background or foreground.

A compiler and/or program development tools are likely to perform at least one of the following operations: preprocessing, lexical analysis, parsing (syntax analysis), semantic analysis, code generation, code optimization, auto-completion, etc. Programming development tools may include a tool that generates and/or displays (e.g., in a source code program editor) suggestions for missing #include statements as described more fully above.

Some languages, such as but not limited to C-based languages, typically undergo a preprocessing phase (e.g., by a preprocessor) which supports macro substitution, file inclusion and conditional compilation. Typically, a preprocessor processes and removes preprocessor directives from the source code before the lexical analysis phase. The preprocessing phase may receive a token stream generated by a lexer and output a modified token stream that does not include preprocessor directives. Lexical analysis (performed by a lexical analyzer or lexer) can break the source code text into tokens in a token stream. A token is a single atomic unit of the language, such as a keyword, an identifier, a symbol name, a function, a type, etc. Preprocessing typically occurs before syntactic or semantic analysis; e.g. in the case of C, the preprocessor may manipulate lexical tokens rather than syntactic forms. However, some languages may support macro substitutions based on syntactic forms.

A syntax analyzer may perform syntax analysis. Syntax analysis involves parsing the token sequence to identify the syntactic structure of the program. The syntax analysis phase typically builds a parse tree. A parse tree replaces the linear sequence of tokens of token stream with a tree structure built according to the rules of a formal grammar which define the syntax of the programming language. The parse tree is often analyzed, augmented, and transformed by later phases in the compiler.

In a semantic analysis phase performed by a semantic analyzer, the parse tree is augmented with semantic information to generate a parse tree. The semantic analyzer typically also builds a symbol table. Semantic analysis performs semantic checks such as type checking (checking for type errors), or object binding (associating variable and function references with their definitions), or definite assignment (requiring all local variables to be initialized before use), and may reject incorrect programs or issue warnings. Semantic analysis usually logically precedes the code generation phase, though multiple phases may be folded into one pass over the code in some compiler implementations.

System 100 may include an editor 105 in which source code 124 for a computer program may be written or developed. Program development tools may parse the source code 124 as the source code 124 is developed within the editor 105 at predetermined or at specified times (for example, at specified intervals or at the end of a statement or when the software development environment is inactive or idle, such as, for example when a developer pauses). Program development tools may query a data source at any time and provide information in various ways to the benefit of the user and to aid in development of the program. The program development tools may provide real time updated information about program elements and may provide other means to help the development of the program such as providing compilation errors and warnings, etc. as the developer is writing the program in the editor. Background compilation may not generate executable code, and/or may use a different compiler than the one used to generate executable code.

The input source code 124 comprises a sequence of program instructions. Input source code 124 may be written in any C-based programming language. Input source code 124 may be written in any programming language, whether object-oriented or imperative, in which preprocessor directives are used and which have a programming construct (e.g., a declaration or definition that declares or announces the existence of a variable, function, procedure, method, subroutine, or the like or defines a variable, function, procedure, method, etc). The programming construct may be a header file. System 100 or portions thereof may perform the methods described above.

Example of a Suitable Computing Environment

Figure 3:
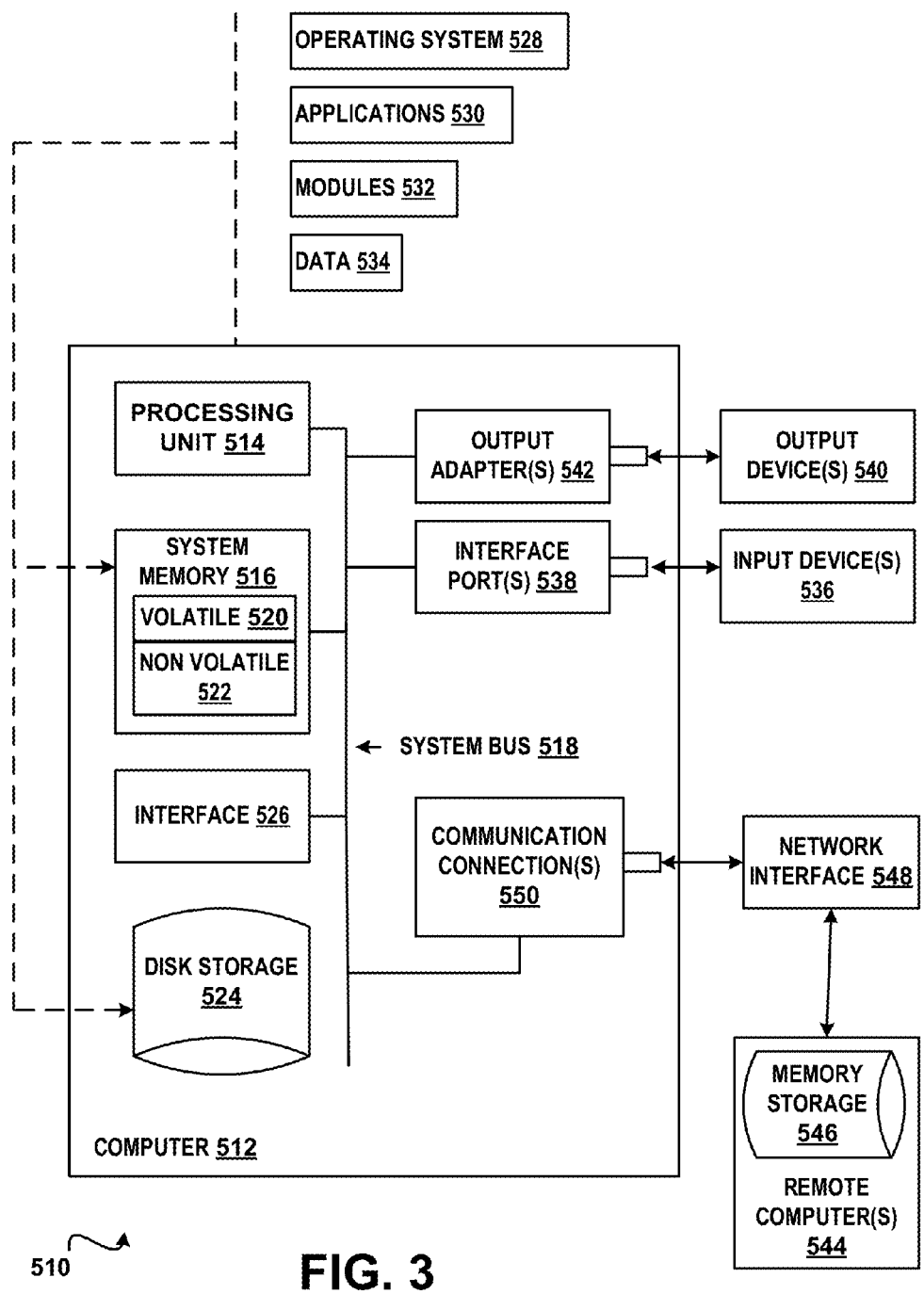
FIG. 3 is a block diagram of an example of a computing environment in accordance with aspects of the subject matter described herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory.

Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Figure 4:
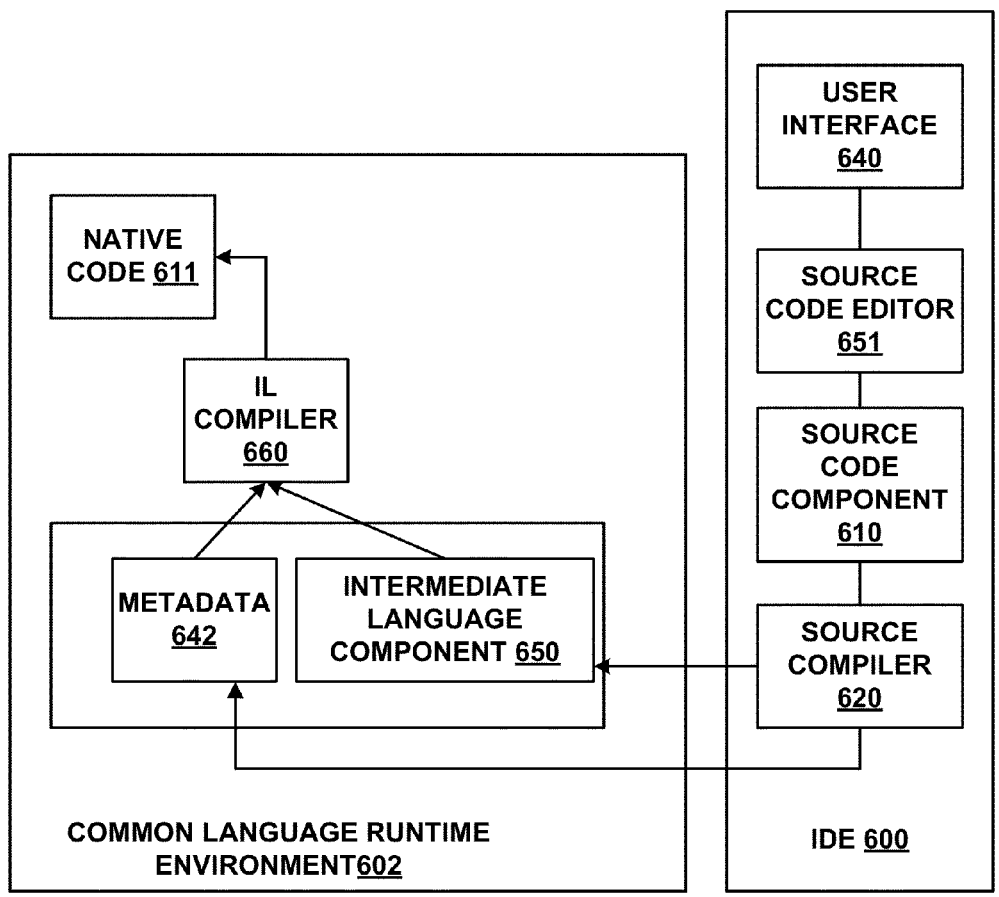
FIG. 4 is a block diagram of an example of an integrated development environment in accordance with aspects of the subject matter described herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
   at least one processor: and
   a memory connected to the at least one processor;
   wherein the at least one processor is configured to:
   generate suggestions to correct an error comprising an undefined token in program source code by using an include graph for a project, wherein the include graph includes a plurality of nodes, a node represents a file associated with the project, wherein a project includes a collection of files needed to generate an executable of the program source code, the suggestions generated by traversing the include graph to find all paths going from a node representing a file in which the undefined token is found to a project node, wherein each traversed path is segmented based on a folder in which a node resides; and
   display a topmost file in each directory associated with a folder that includes an external file having a definition for the undefined token as a suggestion to correct the error, wherein the external file is external to the project.

2. The system of claim 1, wherein the undefined token is undefined because of a missing #include statement in a C-based programming language.

3. The system of claim 1, wherein the undefined token is undefined because of a missing definition.

4. The system of claim 1, wherein use of an abstraction for a header file enables platform-independent source code to be generated.

5. The system of claim 1, wherein the program source code generated is platform-independent.

6. The system of claim 1, wherein use of an abstraction for a header file enables source code to comply with guidelines for writing program source code.

7. A method comprising:
   detecting an undefined token error in program source code;
   accessing by a processor of a computing device an include graph for a project, the include graph representing a plurality of nodes, a node of the plurality of nodes represents a file associated with the project, wherein a project includes a collection of files needed to generate an executable of the program source code;
   obtaining all paths originating from a node representing a file that includes the undefined token;
   segmenting each path based on a folder in which the node representing the file that includes the undefined token resides, wherein the file that includes the undefined token is external to the project; and
   displaying the file represented by a last node in the include graph before a project node as a suggestion for correcting the error.

8. The method of claim 7, further comprising ending the traversal of each path when a node in the traversed path is included in the project.

9. The method of claim 7, further comprising:
   for each of the paths, walking up the include graph from the node representing the file that includes the undefined token.

10. The method of claim 8, further comprising:
    every time a folder including the file that includes the undefined token changes, displaying a last file in the folder that includes the undefined token that changed as a suggestion to correct the error.

11. The method of claim 7, wherein a file that is part of a current project is not offered as a suggestion to correct the undefined token error.

12. The method of claim 7, further comprising:
offering a file of a segment closest to a project node in the include graph at a top of a list of correction suggestions.

13. The method of claim 7, further comprising:
displaying correction suggestions in order of proximity to a project node.

14. The method of claim 7, further comprising:
displaying a file in which the undefined token is defined at a bottom of a list of correction suggestions.

15. The method of claim 7, wherein the program source code is platform-independent.

16. The method of claim 7, wherein the program source code is platform-dependent.

17. A system comprising:
at least one processor:
a memory connected to the at least one processor;
wherein the at least one processor is further configured to:
in response to detecting an undefined token in program source code, generating suggestions to correct the program source code by finding at least one file in an include graph for a project, wherein the include graph includes a plurality of nodes with each node representing a file associated with the project, wherein a project includes a collection of files needed to generate an executable of the program source code, the suggestions generated by traversing all paths from a node representing a file in which the undefined token is found to a project node, wherein each traversed path is segmented based on a folder in which a node resides;
and
displaying at least one external file as a correction suggestion, the at least one external file associated with a folder associated with a node of the include graph, the at least one external file includes a definition of the undefined token and is external to the project.

18. The system of claim 17, further comprising:
traversing nodes in the include graph for the project to which the program source code belongs;
displaying correction suggestions in order of proximity to a project node.

19. The system of claim 18, wherein corrected program source code is platform-independent.

* * * * *